(12) United States Patent
Tanguay, Jr. et al.

(10) Patent No.: US 7,061,485 B2
(45) Date of Patent: Jun. 13, 2006

(54) METHOD AND SYSTEM FOR PRODUCING A MODEL FROM OPTICAL IMAGES

(75) Inventors: Donald O. Tanguay, Jr., Palo Alto, CA (US); W. Bruce Culbertson, Palo Alto, CA (US); Daniel G. Gelb, Redwood City, CA (US); Michael Harville, Palo Alto, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 302 days.

(21) Appl. No.: 10/684,067

(22) Filed: Oct. 9, 2003

(65) Prior Publication Data

US 2004/0189686 A1 Sep. 30, 2004

(51) Int. Cl.
*G06T 15/00* (2006.01)
(52) U.S. Cl. .............................. 345/419; 433/24; 705/4
(58) Field of Classification Search ................ 345/419, 345/420, 619; 705/1, 4, 7; 433/24, 25, 72, 433/213
See application file for complete search history.

(56) References Cited

U.S. PATENT DOCUMENTS 6,632,089 B1 * 10/2003 Rubbert et al. ................ 433/24
6,648,640 B1 * 11/2003 Rubbert et al. ................ 433/24
6,826,539 B1 * 11/2004 Loveland ........................ 705/7

* cited by examiner

Primary Examiner—Phu K. Nguyen

(57) ABSTRACT

Disclosed is a method for producing a model of an object, comprising receiving at least one image of the object in a computing device, processing one or more of the at least one image to produce a model of the object, generating feedback information corresponding to the model of the object, and imparting the feedback information to a user of the computing device concurrently with the processing such that a determination is enabled to be made whether the model of the object is of a desired quality while the computing device is disposed to receive a further image of the object. The feedback information can be an image of the model which enables a user to determine whether an additional image is necessary or the feedback information can be direction to acquire an additional image of the object.

35 Claims, 9 Drawing Sheets

METHOD AND SYSTEM FOR PRODUCING A MODEL FROM OPTICAL IMAGES

FIELD OF THE INVENTION

The present invention relates to the field of computer imagery. Specifically, the invention relates to computer modeling.

BACKGROUND OF THE INVENTION

Computer models used in graphics simulations have been used for a range of tasks as diverse as pilot training, automotive design, and architectural walkthroughs. Medical imagery has come to depend on computer model imagery for aiding in diagnoses and for guiding critically dangerous surgeries. The entertainment industry has developed techniques for creating startling special effects and realistic simulations. Even virtual reality games use convincing imagery with great success.

Computer models, however, are still only as good as their definitions. When modeling actual objects, models depend either on incredibly complex written descriptions, on artistically constructed models whose quality depends on the individual skill of a human modeler, or on models derived from scanned or otherwise acquired images. The acquisition of images on which to base model production, even though it includes many forms of acquisition, can be colloquially referred to as scanning.

There are multiple types of scanning. In two-dimensional (2D) scanning, the object of interest is flat and possibly large (e.g., printed documents and whiteboards). When a large object has to be captured at high-resolution, a single image of the object is often insufficient. To ensure capture of the object at sufficient resolution, a camera can be moved in a path in front of the object, or small motions of a camera provide image sampling from slightly different angles. A high-resolution image of the object can then be generated from the sequence of images.

In three-dimensional (3D) scanning, the object of interest has a depth component and it is often necessary to see more than a single side of the object. A camera is moved around the object to get full coverage of the object. The end result is a 3D model of the object, including high-resolution surface textures.

Digital photography allows simple, quick capture of digital images. However, a single image is not good enough to represent 3D artifacts and large 2D surfaces: the back side of a 3D object is not visible in the image, and large 2D objects, such as whiteboards or walls, are not captured with sufficient resolution to be readable.

Document scanning often uses bulky scanners attached to computers with a cumbersome user interface. Some simpler hand-held scanners are appearing, but they must be drawn across the surface of the document, in which case scanning a large board is impractical.

Image/video stitching (mosaicking) methods are known in the art. Typically these are used for scanning an environment, for example a 360-degree panoramic background image. However, image stitching assumes particular camera motions (e.g., a constant center of projection) that are unrealistic for hand-held object scanning, and no guidance exists to aid a user in acquiring the images actually needed to produce a model.

3D scanning is performed with a variety of methods. Very expensive and large laser scanners have been employed to capture the geometric shape of statues. These scanning devices, though, are bulky and require demanding operating environments and on-site calibrations.

Cheaper methods, using uncalibrated cameras, have appeared that simplify the task of 3D object scanning. However, they require significant user training in order to produce a usable image.

What is needed, then, is a method for acquiring images for model production that uses an easily portable camera that does not require extensive calibration prior to each image acquisition. Furthermore, such a method should be able to be performed by a relatively untrained user yet produce images sufficient to produce models that meet measurable desired qualities.

SUMMARY OF THE INVENTION

Disclosed is a method for producing a model of an object, comprising receiving at least one image of the object in a computing device, processing one or more of the at least one image to produce a model of the object, generating feedback information corresponding to the model of the object, and imparting the feedback information to a user of the computing device concurrently with the processing such that a determination is enabled to be made whether the model of the object is of a desired quality while the computing device is disposed to receive a further image of the object. The feedback information can be an image of the model which enables a user to determine whether an additional image is necessary or the feedback information can be direction to acquire an additional image of the object.

BRIEF DESCRIPTION OF THE DRAWINGS

The operation of this invention can be best visualized by reference to the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, and components have not been described in detail so as not to unnecessarily obscure aspects of the present invention. At times, concepts disclosed in this discussion of embodiments of the present invention will be made more readily apparent by reference to the Figures.

Embodiments of the present invention enable the rapid and efficient acquisition of images for the production of a Model of an object. Embodiments can use real-time feedback information to correct and direct the image acquisition process, enabling an unsophisticated user to efficiently and rapidly acquire the images necessary to produce a Model of a desired quality with a minimum of equipment and training. Embodiments can enable an entire Model production apparatus to be self-contained in a handheld device, thus avoiding the need for bulky, expensive, equipment which needs frequent recalibration.

Figure 1:
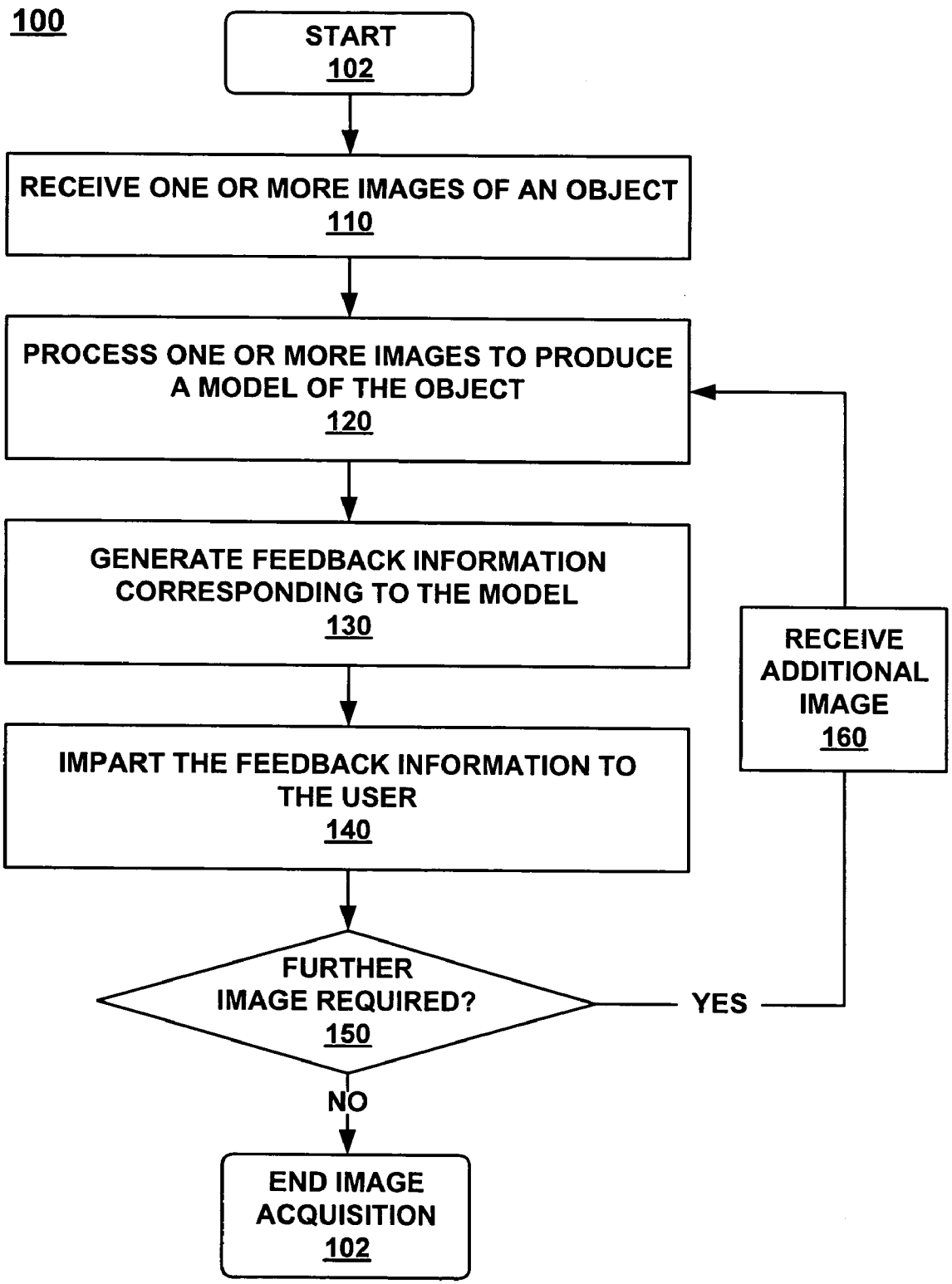
FIG. 1 is a flow chart illustrating a method for producing a model from optical images in accordance with embodiments of the present invention.
Figure 2A:
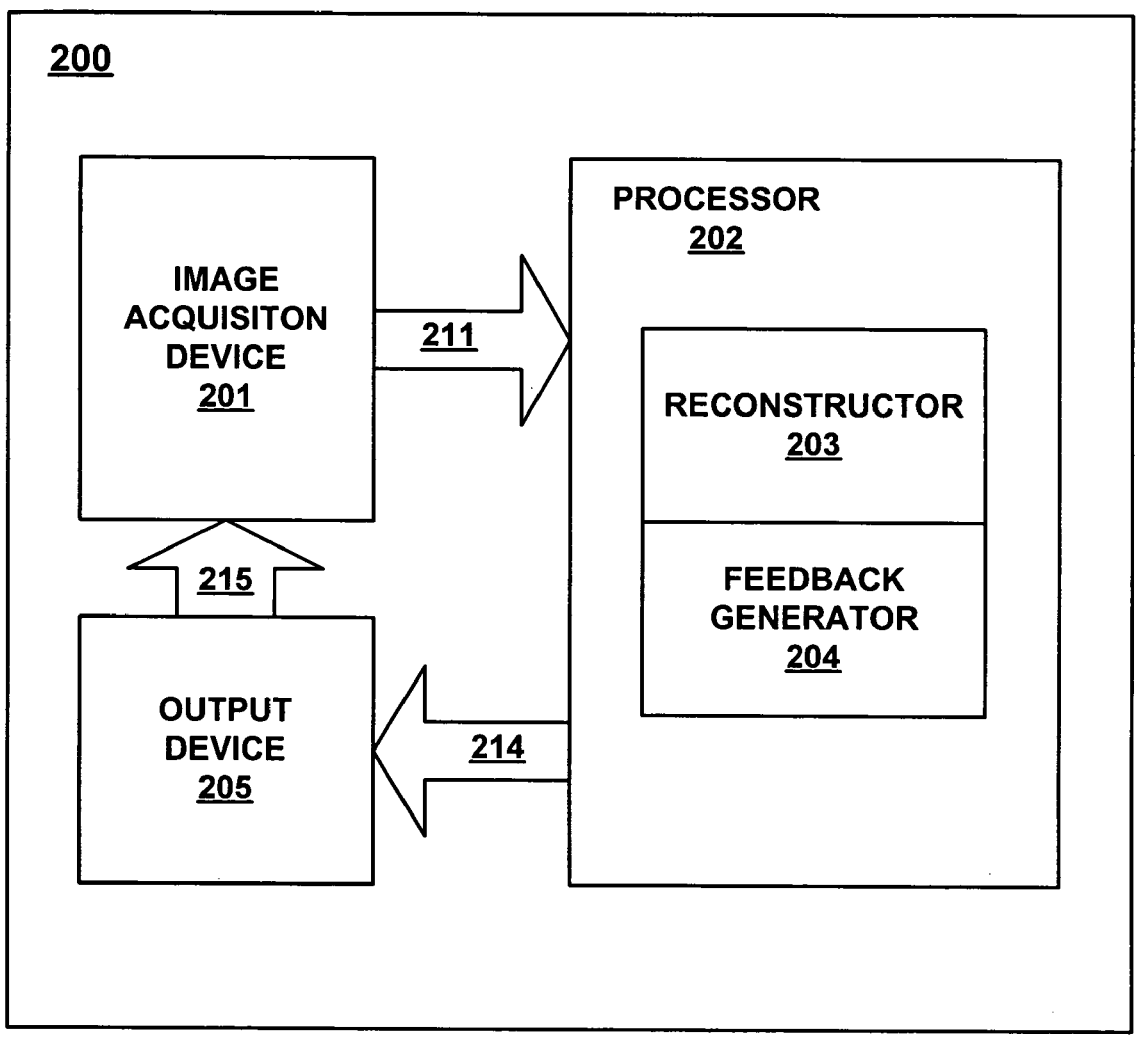
FIG. 2A is a block diagram of a system for producing a model from optical images in accordance with an embodiment of the present invention.

A general discussion of a method for producing a model of an object is more readily apparent by reference to FIG. 1 concurrently with subsequent Figures which illustrate implementations of the process steps introduced in FIG. 1. Specifically, FIG. 2A illustrates functional implementation of the process steps illustrated in FIG. 1.

FIG. 1 is a flow chart 100 illustrating a process method for producing a model of an object through the feedback-enhanced acquisition of images. FIG. 2A is a block diagram of a system for producing a model from acquired images. System 200 comprises an image acquisition device 201, a processor 202, a reconstructor 203, a feedback generator 204 and an output device 205.

Process 100 of FIG. 1 commences at step 110 by receiving a plurality of images of an object for which a model is desired. The receiving of images can result from the active, directed, acquisition of images or by undirected (i.e., self-determined) acquisition of images by a user of an image acquisition device 201. System 200 of FIG. 2A illustrates the implementation of image acquisition device 201 which is used to accomplish step 110.

The receiving of images in step 110 can be accomplished by a number of methods. In one embodiment, the receiving of images is from those acquired by the use of image acquisition device 201 or its equivalent. In another embodiment, images from another source, for example from medical imaging machinery such as an X-ray machine, or from an historical archive, can be received and used to produce a model.

Image acquisition device 201, in embodiments of the present invention, can include a self-contained model producing device, a camera permanently or removably coupled to a handheld computing device or personal digital assistant (PDA), a stand-alone digital camera, a handheld camera connected by cable or a wireless connection to a personal computer, or any other device capable of acquiring electronic images. One embodiment can acquire images in a camera-enabled cellular phone and such devices are readily available to the consumer. It is noted that the form factor of a specific implementation does not limit the functionality of the implementation of image acquisition device 201.

It is noted here that images acquired by image acquisition device 201 can be in many different formats. Embodiments of the present invention are enabled to acquire digital and analog video images, multiple digital still images, or, in the example of some medical imagery, images that can be in the form of MRI (magnetic resonance imagery), X-ray, infrared, or other non-visual sources. It is noted that MRI, X-ray, and infrared image acquisition techniques are known and used in disciplines other than medical imagery.

Referring still to step 110 of FIG. 1 and also to FIG. 2A, several advantages are realized in the present invention. Specifically, the present invention is well suited to utilizing an image acquisition device 201 which is comprised of a portable, readily available, user-friendly, and typically inexpensive, image sensor. As such, the present embodiment enables images to be easily acquired "in the field." That is, unlike conventional, bulky, static, scanning devices, image acquisition device 201 of the present invention can be used to acquire images wherever the user desires. Thus, an object to be reconstructed does not need to be physically moved to the location of a scanning device. Furthermore, by not requiring the use of a complex scanning device, the present embodiment allows even an unsophisticated or untrained user to effectively acquire images of an object to be reconstructed. In so doing, the present embodiment eliminates the need for costly and time-consuming training of the user who is to acquire images of the object to be reconstructed. Further, the use of a cheap, off-the-shelf, implementation of image acquisition device 201 reduces the cost of care and maintenance of such a device. Use of such a device "in the field," which can risk damage, soiling, or loss to an image acquisition device, becomes much more cost effective.

Referring now to step 120 of FIG. 1, images acquired by image acquisition device 201 are then processed to produce a model of the object. In order to be processed, the images must be passed to a processor. In one embodiment, as depicted in FIG. 2A, images are transmitted via link 211 to processor 202. It is noted here that the functional elements illustrated in FIG. 2A may be implemented in many different ways and are not limited to any specific form. It is also noted that FIG. 2A illustrates reconstructor 203 and feedback generator 204 as functional elements within processor 202, indicating that reconstructor 203 and feedback generator 204 can be implemented as software programs resident in processor 202. However, processor 202 and feedback generator 204 can also be implemented as stand-alone elements. An example of this implementation is in a network environment wherein images are passed to a server housing processor 202 which then passes the images to a dedicated modeling server located elsewhere which processes the images into a model. It is noted that any implementation of reconstructor 203 will comprise, at least in part, a processor of some sort.

In one embodiment, image acquisition device 201, processor 202, reconstructor 203, feedback generator 204 and output device 205, as well as the functional links between them, are resident in a single, handheld, portable, unit. This portable unit can be used to implement the acquisition or receiving of images at step 110. Other steps in process 100, discussed in detail below, are also accomplished within such a portable, self-contained device. As will be discussed below, modeling of the object of interest can take place within the same unit, enabling a user in the field to autonomously and inexpensively produce a model.

In another embodiment, image acquisition device 201 and output device 205 are resident in a handheld device as in the example above, but processor 202, reconstructor 203 and feedback generator 204 located else where in a wireless network. In this example, image acquisition and feedback imparting are accomplished over the wireless network.

It is noted here that a model formed in reconstructor 203, as the term is used in this description, can be an electronic model of an object in either two or three dimensions, or it can be an enhanced version of the images acquired. It is noted here also that processes by which images are processed to produce models from two-dimensional (2D) and three-dimensional (3D) objects are known in the art and are not described herein at length for the purpose of brevity and clarity. However, known methods include time-of-flight camera scanning, stereo camera scanning, feature tracking/reconstruction, geometric modeling including vertices, lines and planes, plenoptic function modeling and light ray sampling, and, in two-dimensional modeling, mosaicking techniques such as image stitching for panorama construction, and enhancement techniques such as synthetic aperture imagery.

In one embodiment, the electronic model is a 3D model of the object that in reality is only viewable from certain points. In another embodiment, modeling of an object allows virtual viewing of the object from any viewpoint. In one embodiment, the model is of an injury and the model is formed from images acquired by x-ray or MRI (magnetic resonance imagery) or other such imagery. Such a model enables medical personnel to view details normally available only through expensive and/or complex, and sometimes dangerous, means, or in some cases not available at all. In yet another embodiment, the model is a computerized model of the object that can be incorporated into a movie thus allowing actors to interact with the model in ways not otherwise possible.

In yet another embodiment, the model is comprised of resolution enhancement of a 2D object. In one such embodiment, a display board in a conference room, for example, may be too far from a video camera to show its contents to remote participants in a teleconference. By producing a model of the board, from images whose acquisition is feedback enhanced, as described in detail below, the present embodiment allows the details contained on the board to be resolved sufficiently to allow reading by those remote participants.

Referring again to FIG. 1, at step 130, process 100 uses the model produced at step 120 and generates feedback information that corresponds to the model. Step 130 is accomplished by an implementation of feedback generator 204, shown in FIG. 2A. As shown, feedback generator 204 is implemented as a software program resident in processor 202. However, feedback generator 204 can also be implemented as a stand-alone unit.

In one embodiment, an example of a stand-alone feedback generator is that of a that of a compute cluster located remotely from the venue of image acquisition. Through speech synthesis methods, the feedback information in this example can take the form of verbal instructions from the compute cluster to a field operator of image acquisition device 201 concerning the acquisition of additional images.

In another embodiment, an example of a stand-alone feedback generator is that of a rendering supercomputer located remotely from the venue of image acquisition. The feedback information in this example can take the form of verbal instructions from the supercomputer operator to a field operator of image acquisition device 201 concerning the acquisition of additional images. The supercomputer operator can generate instructions (feedback information) based on a human determination of a desired quality of the model being produced.

As is described below in detail, feedback information corresponding to the model of the object is ultimately imparted to a user of the image acquisition device 201. In general, feedback information generated at step 130 by feedback generator 204 indicates the quality of the model of the object.

The quality of the model, as assessed by feedback generator 204, can correspond to any of a number of measurable or verifiable characteristics of a model. One example of a desired quality is the presence or absence of a particular known detail in a view of a model. In one embodiment, a car manufacturer, for example, may require a model of a vendor-supplied car part to integrate into a complex CADD (computer-aided design and drafting) model of a car. The reconstructor can have prior knowledge of the location of expected details in the part (a particular electrical connector for example) and, when forming the model, use the presence or absence of those details in the model as an indication whether or not the model is of a desired quality.

A desired quality, in embodiments of the present invention, can be selected by the user. Such a quality or characteristic can be one that is subjectively assessed by a user, such as an apparent resolution or completeness of a graphic representation of a model. A quantifiably selectable desired quality is one that can be automatically assessed by a device, such as a specific resolution of detail. In an embodiment employing such an automatic assessment, known methods can determine the granularity of a surface or an edge of the model. In another embodiment, a measurable quality can be the existence of a specific number of expected surfaces in the object being reconstructed. A user in this example can pre-select the number of expected planar or near planar surfaces and the feedback generator. In yet another embodiment, the resolution of a surface texture of the model can be objectively and automatically assessed by known processes. Achievement of a selected level of resolution, or its lack thereof, can be used to form feedback information by feedback generator 204. In other embodiments, the model can be assessed for closure (having a distinct inside volume and outside volume, for example) or determination of missing regions. A desired quality can be any of the characteristics of models known in the art that can be selected by a user.

When the achievement of a desired quality is determined by a user, a quality that is not readily quantifiable can be used. Such a non-quantifiable quality can be the appearance of a graphic representation of a model or the appearance, or lack thereof, of features in the representation of the model that the user knows to be present in the object being reconstructed.

The actual feedback information, as noted above, can take different forms. In one embodiment, the feedback information is comprised of instructions for the user of image acquisition device 201 that direct the acquisition of additional or replacement images. The feedback information of the present embodiment is well suited to being visual or aural instructions, as in the supercomputer operator example above, or direct electronic instructions. Such instructions can, in one embodiment, be as simple as an instruction to acquire another image or as complex as directing a camera placement and lighting or, in the implementation of a video camera for example, a direction of, or a suggestion of, a camera pathway through space. As will be described in detail in conjunction with step 140, the instructions can be, in embodiments of the present invention, visually presented on a graphic display, aurally presented through a speaker or headphone system or presented as direct commands to an automated or mechanized camera controller.

In one embodiment, feedback information generated by feedback generator 204 can take the form of a graphic representation, or image, of the model, as it is formed. The graphic representation can take the form of an abstraction of the model with highlights or other indication of a portion of the model which has or has not achieved the desired quality. It is noted that, for purposes of the present application, such an implementation is referred to as a device-directed method.

In another embodiment, the graphic representation can be an image of the model presented in the best resolution available in order to allow the user to determine if more images, or images from a different aspect, are required to complete the model with a desired quality. It is noted that, for purposes of the present application, such an implementation is referred to as a user-directed method.

By generating feedback information, embodiments of the present invention enable a rapid assessment of a model. More specifically, in one embodiment, by generating feedback information, a determination of qualities and characteristics of the model can be readily made by a user viewing the model (user-directed). Additionally, in one embodiment, by forming an abstraction of the model, such as an engineering multi-view, or an outline representation of an object reconstructed, a determination can be made by the reconstructor 203 of the attainment of a desired quality (device-directed). Further, the present embodiment is then able to form directions, as feedback information, to direct the user to acquire further or better images.

Referring next to step 140, the present embodiment then imparts the feedback information generated at step 130 to a user. System 200 in FIG. 2A illustrates an implementation of imparting feedback information utilizing link 214 and output device 205. Imparting feedback information to a user can be accomplished by any of a number of means. In one embodiment, feedback is imparted by presenting a graphic representation of the model, as it is formed, to the user acquiring the images of the object to be reconstructed. For example, in one embodiment, a graphic representation of the model is implemented in a graphic display on output device 205. Output device 205 can be implemented as a graphic display by any applicable means, such as, for example, by CRT (cathode-ray tube), LCD (liquid crystal display) or LED (light-emitting diode) display and the like. It is noted that implementation of the imparted feedback information, whether by a user, an automated device, or some other means, is represented in FIG. 2A by link 215.

In one embodiment, a device-directed approach imparts the feedback information, in a graphic display available to the user, in which portions of the model can appear with noticeable characteristics, such as highlighting. In one such embodiment, the highlighting informs the user that the highlighted portion of the model of the object in question lacks sufficient imagery needed to produce a model that meets the desired quality.

It is noted here that the feedback information generated at step 130 and imparted to the user in step 140 can, in one embodiment, be generated in real time, meaning that the feedback is available to enhance image acquisition during the acquisition process. By generating the feedback information in real time, the acquisition of images can be directed during the image acquisition and model reconstruction processes to efficiently acquire images sufficient to produce a model that meets some desired quality.

In another embodiment, an example of the imparting of device-directed feedback information is the presentation of instructions to the user that direct the acquisition of images. The instructions can be visual, aural, as in the supercomputer operator example above, tactile, or direct electronic instructions. It is noted that the means by which feedback information is presented to a user is not meant to limit the functions of embodiments of the present invention.

By imparting real-time feedback to an image-acquiring user, the acquisition of sufficient images is made effective and efficient. By enabling the user to know, during image acquisition, whether the number and quality of images, and the specific images acquired, are sufficient to enable the production of a model, the length of time necessary for image acquisition is greatly shortened. Imparting feedback to the user eliminates a prior process in which images were acquired, then a model was formed, and then, only after a user examined the model, could it be known whether the images acquired for the modeling were sufficient to form the desired model. By imparting feedback to the image-acquiring user, many conventional steps are made unnecessary.

It is noted that the form of the imparting of feedback can be suited to a specific situation. An image-acquiring user in a noisy environment, for example, may not be able to hear verbal instructions and may find a visual presentation of feedback information to be better suited. In another example, a combat soldier may be required to acquire infrared imagery of a closely-guarded hostile target. In this situation, a visual imparting of the feedback information may give away the presence of the soldier and jeopardize his mission. Then a verbal feedback imparting would be advantageous. Advantageously in the above and other situations, the imparting of feedback information during the acquiring of images reduces the time required to acquire sufficient images and ensures that there is no future need to acquire further images.

At step 150 in process 100, if no further images are required, the process proceeds to 199 and is complete. If further images are required, they are acquired as described above. Once the further images are acquired, the present embodiment then repeats steps 120, 130, 140, and 150. As indicated earlier, the determination can be made by a user based upon feedback information or automatically by the system producing the model.

Figure 2B:
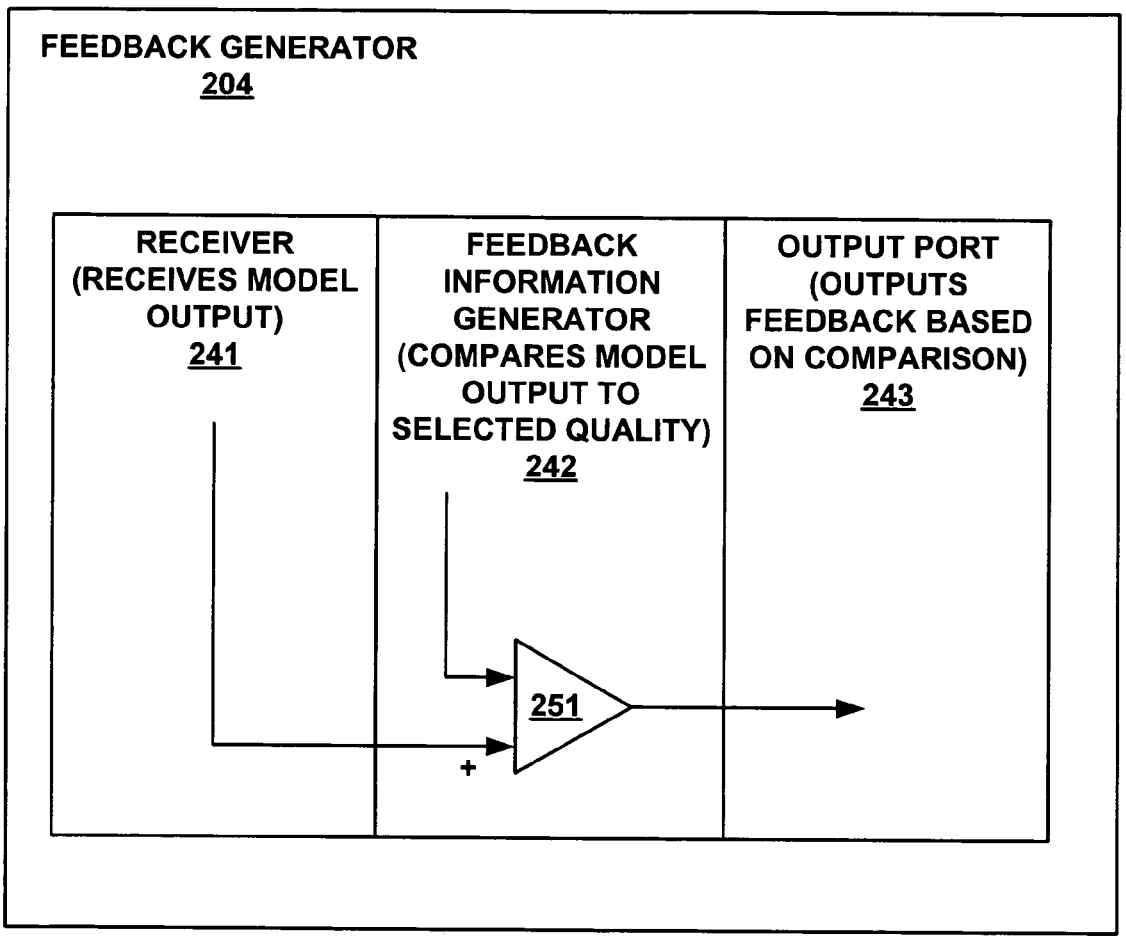
FIG. 2B is a block diagram of feedback generator in accordance with an embodiment of the present invention.

FIG. 2B illustrates one embodiment of a feedback generator in accordance with embodiments of the present invention. Feedback generator 204 comprises a receiver 241 for receiving the output information of a produced model. The output information can be any form of information that can be analyzed, whether it is a form of numerical analysis of part of the model or a complete description of the model itself.

Feedback generator 204 also comprises comparator 242 which can also be referred to as a feedback information generator 242. Comparator 242 is enabled, in this embodiment, to compare the model output, or some portion of it, received by receiver 241, to some measurement standard. The measurement stand can be selected by a user and can evaluate any quality or characteristic of the model. By way of example, a model of a three-dimensional closed-surface object, such as a sphere, may be evaluated to determine whether the model also comprises a closed surface. This comparison is illustrated by comparator 251. Comparator 251 is not a functional part of feedback information generator 242 but is shown to illustrate one conceptual functioning of feedback information generator 242.

The output of feedback information generator 242 is sent to output port 243. Output port 243 can be a physical output device, such as a network port where feedback generator 204 is implemented as a node in a network, or it can be a function of software resident in a computer whose sole function is to call another bit of software and give the comparison results from feedback information generator 242 to the new subprogram. Output pot 243 can also be implemented in other forms such as a video output to be read by a video output device for presentation to a user. Output port 243 can be implemented in any way that sends the feedback information from feedback information generator 242 to its point of use.

It is noted here again that output sent by feedback information generator 242 through output port 243 can be of many forms. The output can be in the form of digital commands, an optical output, voice, tactile information, or even direct commands to a mechanism capable of receiving and executing them. The feedback information can also be in the form of an indication of how far the production of a model has progressed, such as the depth of texturization of a surface or the closure of a known closed-surface object. Feedback information is presented to the user or an image acquiring system by way of output device 205, as discussed earlier.

Referring yet again to FIG. 1, if the feedback information discussed above so indicates, one or more additional images can be received at step 160. The additional images can include an image taken from another viewpoint or can be the result of following a directed camera path in the example of a video camera, discussed earlier.

Figure 3A:
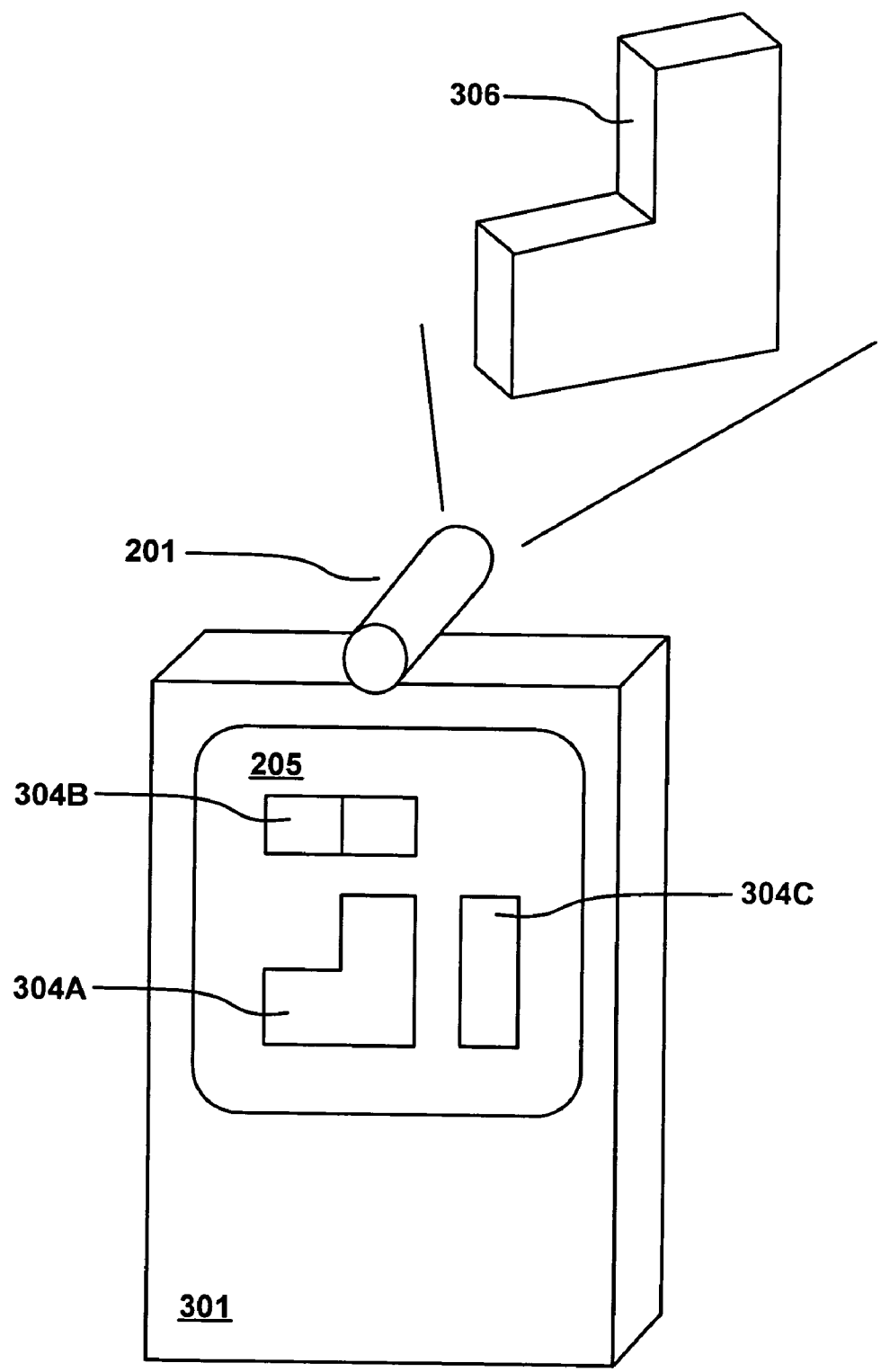
FIG. 3A illustrates an apparatus for producing a model from optical images, in which a multi-view model of a three-dimensional object is being produced in accordance with an embodiment of the present invention.
Figure 3B:
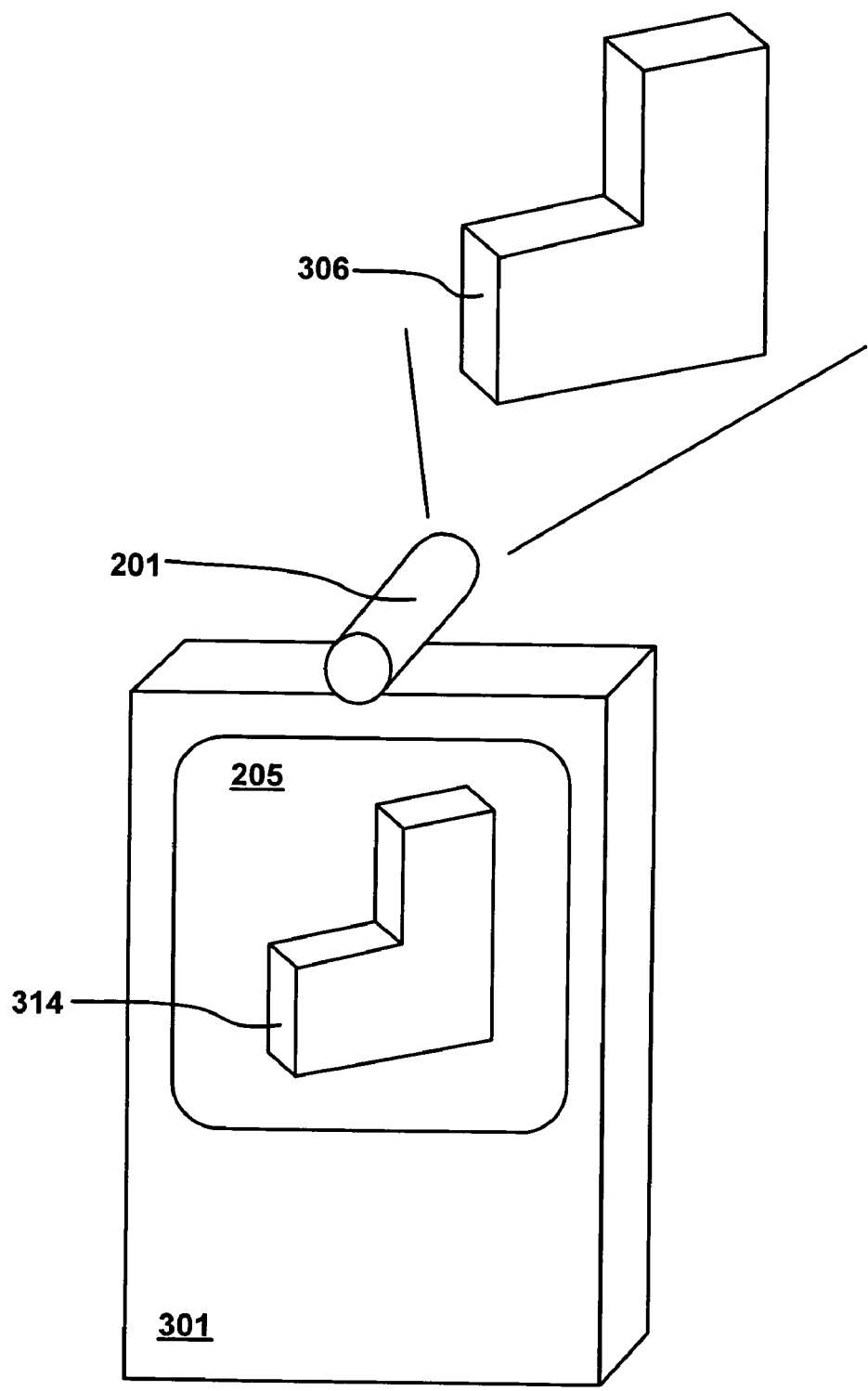
FIG. 3B illustrates an apparatus for producing a model from optical images, in which feedback information is presented to a user in the form of a graphic representation of the model in accordance with an embodiment of the present invention.
Figure 3C:
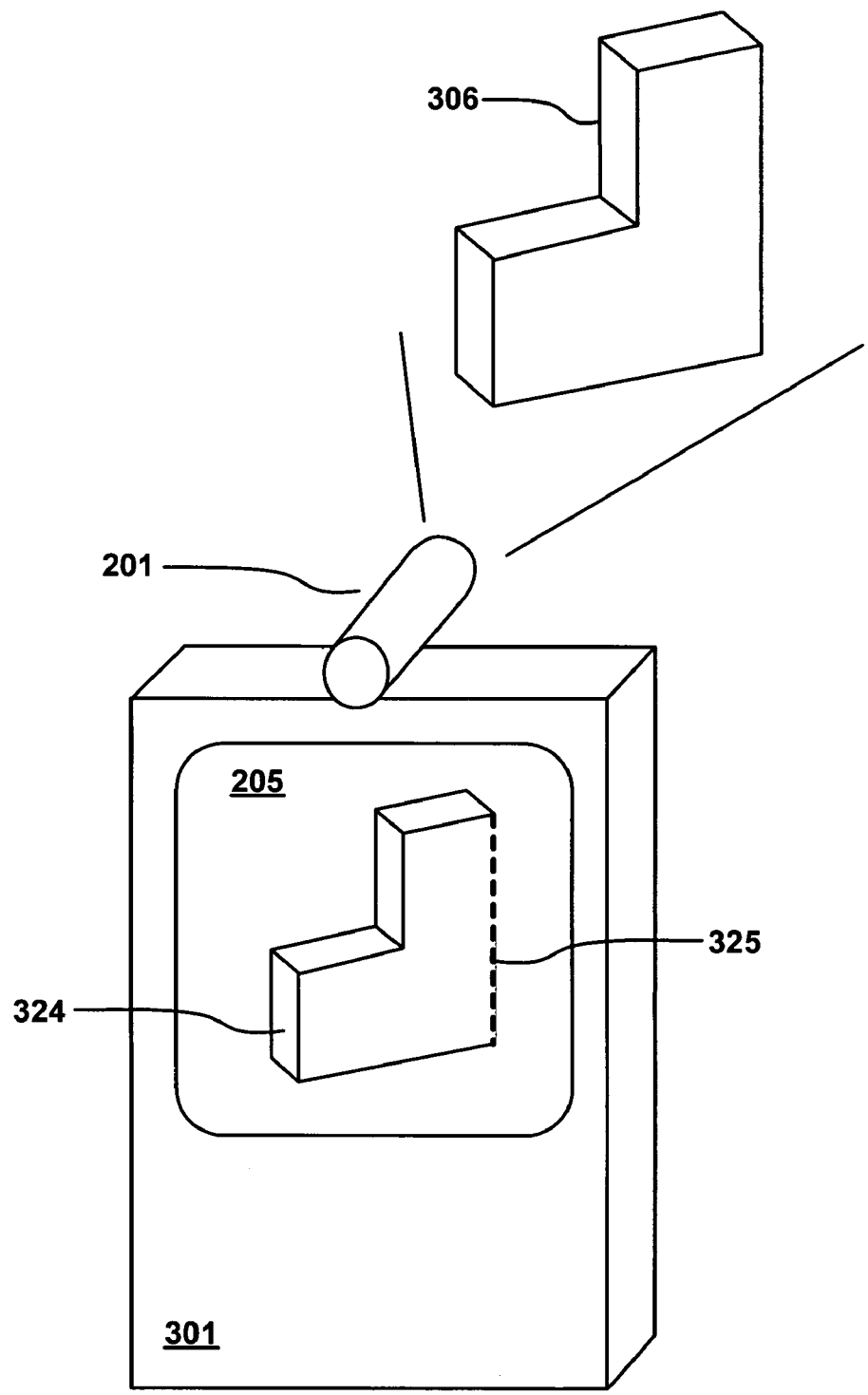
FIG. 3C illustrates an apparatus for producing a model from optical images, in which feedback information is presented to a user in the form of instructions to acquire an additional image in accordance with an embodiment of the present invention.

FIGS. 3A, 3B and 3C illustrate an image acquisition apparatus and methods for producing models and an implementation of forms of feedback presentation. FIG. 3A illustrates an embodiment of an image acquisition apparatus 301. Image acquisition apparatus 301 comprises image acquisition device 201 which is implemented in this embodiment, as a small digital video camera. Other embodiments can implement image acquisition device 201 in other forms, such as a digital camera, analog video camera, or some other device for acquiring electronic images of objects.

Image acquisition apparatus 301 also comprises an output device 205 which is implemented here as a graphic display. The display shown can be any known type of display suitable to image acquisition apparatus 301. Graphic display 303 is shown here with a feedback image.

In one embodiment, feedback information can be in a tactile form. An example of tactile feedback is the use of an infrared image acquisition device being used in darkness, where the user is unable to see a feedback image or to hear aural feedback. Examples of tactile feedback output can be a vibrating image acquisition device that tells a user to acquire further images or to stop further acquisition, or it can be a set of buttons in a device handle that protrude in a desired camera path direction in response to feedback information from the feedback generator.

FIG. 3A illustrates image acquisition apparatus 301 in the process of acquiring an image of object 306. Images of objects such as object 306 are, in this embodiment, processed into a model of the object. In this illustration, the model of object 306 is rendered in display 205 as a three-view rendering. The three views, front 304A, top 304B and side 304C, are produced in a reconstructor as described earlier. It is noted here again that a reconstructor, in one embodiment, can be implemented in the same handheld device as other functional elements of the image acquisition apparatus. In another embodiment, images can be acquired by image acquisition device 201 and sent to a remote processor 202 for further processing.

The three-view image shown in display 205 is generated from the model by feedback generator 204, shown in FIGS. 2A and 2B and described above. In one embodiment, image acquisition apparatus 301 is self-contained, housing all the functional elements necessary to production of a model and to feedback generation and display.

In the embodiment illustrated in FIG. 3A, the user is able to determine from the three-view drawing presented in the display whether the model is of a desired quality. If portions of the three views are not shown, the user can realize which parts of object 306 need further image acquisition. The embodiment illustrated implements a user-directed image acquisition.

In FIG. 3B, display 205 shows a three-dimensional rendering 314 of the model of object 306. This, again, is an implementation of a user-directed image acquisition process, wherein the user can determine from the 3D rendering whether the model has achieved a sufficient quality.

In FIG. 3C, a device-directed acquisition method is illustrated by a highlighted showing of a 3D rendering 324 of the model of object 306. Here, reconstructor 203 has determined, from parameters driven by software and by user pre-selected preference, that a portion of the model has not achieved the desired quality. The portion requiring further imagery is pointed out, in this illustrated example, by dotted line 325 which is meant to show that the rendering presented in display 205 has some noticeable characteristic, such as highlighting of the line or showing it in a different color. One example of a color based feedback is the use of a simple line drawing rendering of the model in which portions which have achieved a measurable quality are shown in green lines and those portions that have not achieved that quality are shown in red. As another example, the current model may have color-tinted regions. Red in the upper left region of an object, for example, indicates insufficient quality in that region. However, the colors in this illustration, or the choice of any other noticeable characteristic, are not meant to limit the choices of such in any implementation of embodiments of the present invention.

Figure 4A:
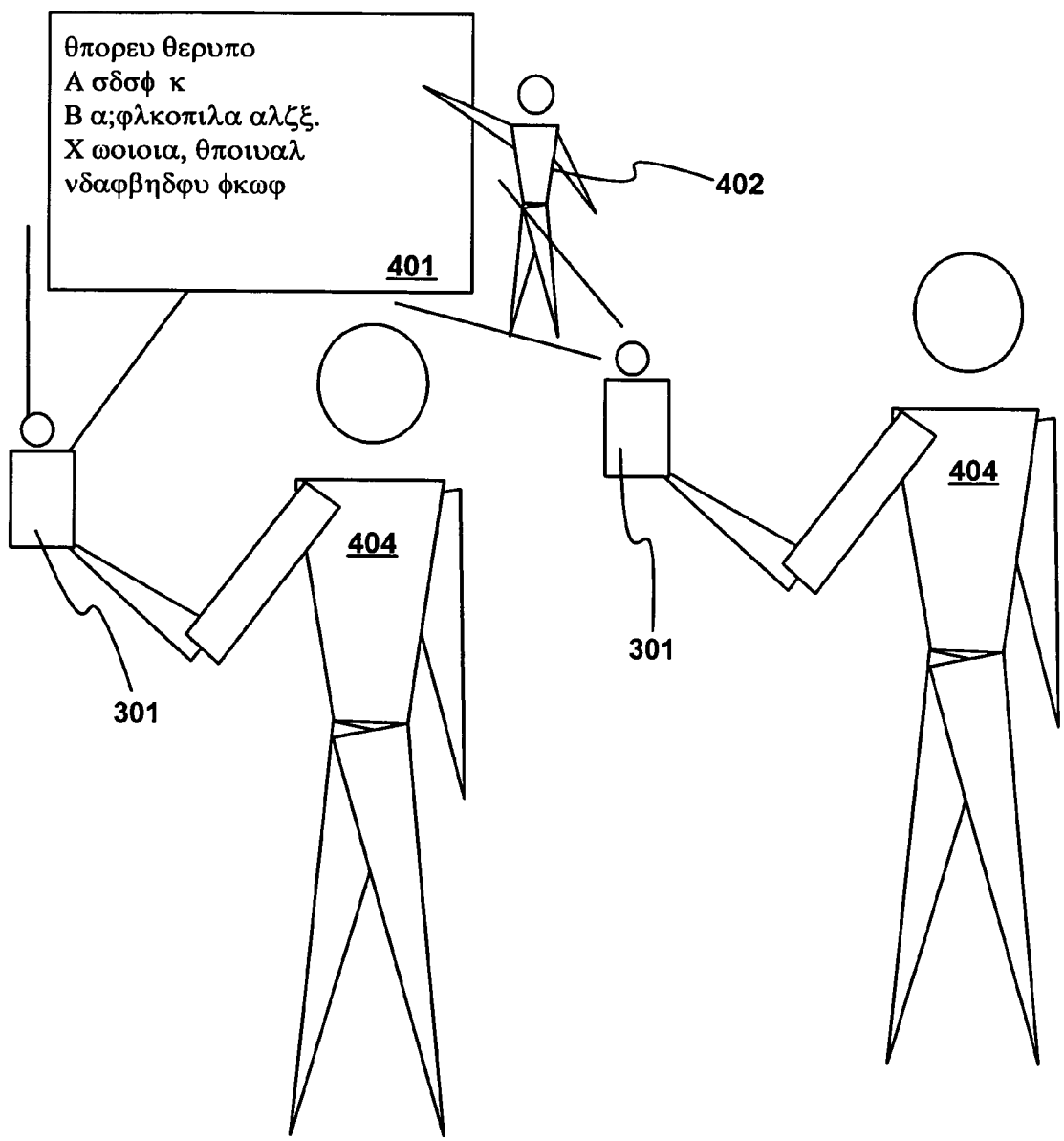
FIG. 4A illustrates acquiring images of a two-dimensional object in accordance with an embodiment of the present invention.
Figure 4B:
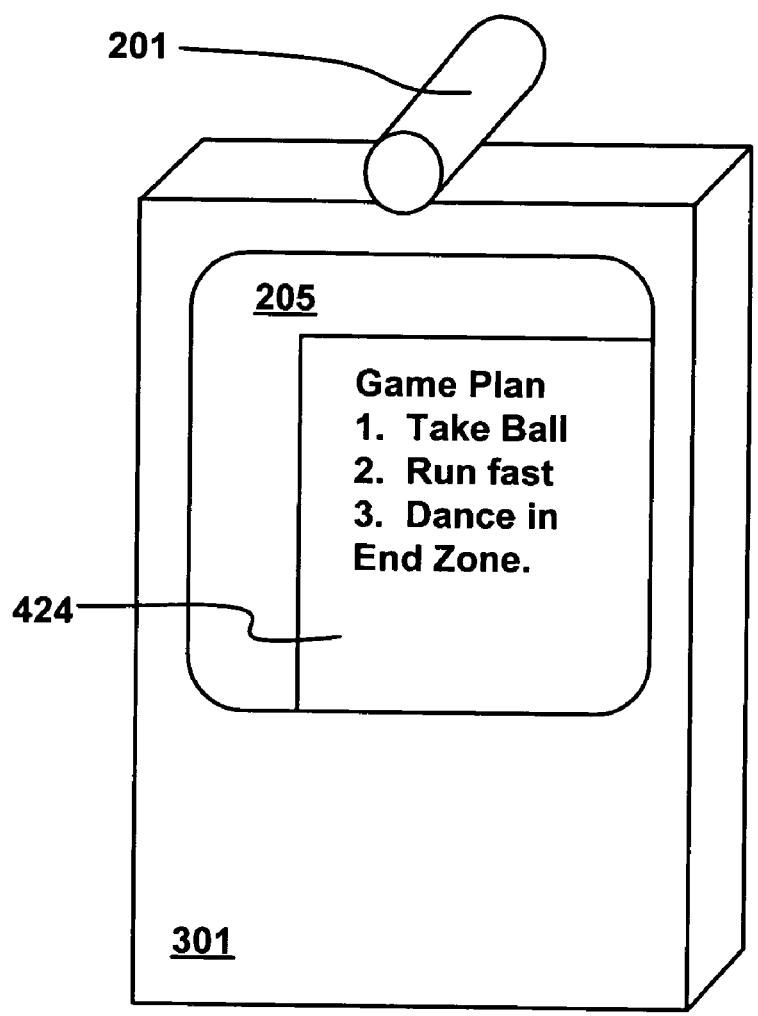
FIG. 4B illustrates feedback information from the production of a model of a two-dimensional object in accordance with an embodiment of the present invention.

FIGS. 4A and 4B illustrate an embodiment of the present invention acquiring images of a 2D object. FIG. 4A illustrates the example of a teleconference in which a presenter 402 is showing information on a large board 401 that is located far from the camera which is intended to acquire images to send to remote conferees. Because a single image, or even a sequence of images, cannot provide enough resolution to make the presented material readable by the remote conferees, the embodiment of the present invention illustrated here is used to acquire images for the model of board 401. By using known techniques, mosaicking (image stitching), for example, or synthetic aperture imagery enhancement, a model can be reconstructed using a plurality of images. Here, user 404 is shown acquiring images from two different positions, in this example, at the back of the conference room, using image acquisition apparatus 301.

In FIG. 4B, display 205 in image acquisition apparatus 301 is shown with the presentation of feedback information generated by a feedback generator as described earlier. The feedback information in this example takes the form of a 2D rendering 424 of a portion of the model which is produced from the images. From the resolution presented in the feedback image, the user is enabled to determine whether further images are required. Alternatively, the resolution may be indicated by color tinting regions of the feedback image. For example, a red tint can indicate low resolution and that further imagery is needed of the part of the object represented by the tinted area.

The example of the teleconference scenario presented in FIGS. 4A and 4B serves well to illustrate another implementation of features of embodiments of the present invention. In a teleconference, or a meeting involving participants located remotely from one another, an embodiment of the present invention can be used to present reliable and detailed models to all attendees, no matter where located. A meeting by a car manufacturer in the United States, for example, can meet with a supplier in Japan for discussing the use of a newly designed part manufactured in Japan. A prototype of the part can exist in Japan but can be examined in detail by the decision makers in the United States by use of the presentation of a computer model produced from images acquired at the meeting site in Japan. In this example, the feedback information discussed above can take the form directives from the U.S. site to the image acquiring user in Japan to acquire more images or to allow a longer exposure time, for example. By using embodiments of the present invention, attendees at meetings involving disparate sites can all be on the same footing when examining physical objects. Teleconference meetings can thus be made more "immediate" to those attendees.

In another example of the use of one embodiment of the present invention, the user begins with the handheld image acquisition apparatus far enough from the object to capture it in a single image. The user then walks forward until the camera views the object at sufficient resolution for the user and proceeds with sweeping, or panning, the image acquisition device 201. Using super-resolution methods an image can be generated that is of higher resolution than the source video images.

It is noted here that known methods exist for 2D and 3D model that can be used for building a model and for integrating additional new images Into a model. From most such methods it is possible to measure the coverage and quality of an image scan. Coverage of an object can be determined directly from the extents and appearance of the model. Quality can be determined from error residuals of the model, as such methods are often posed as a minimization of a particular error metric. Quality can also be indicated as a relative or comparative measure. For example, instead of indicating that the resolution is "bad," the system may instead indicate that the left region is "worse" than the right region.

When there is insufficient computational power on the handheld device to perform all the requisite processing, embodiments of the present invention make use of computing power that can be reached over a network. Video data can be streamed over the network to the computing resources where modeling is performed. Feedback information, whether video, audio, annotations, or other data, is streamed back to the handheld device and conveyed to the user.

Figure 5:
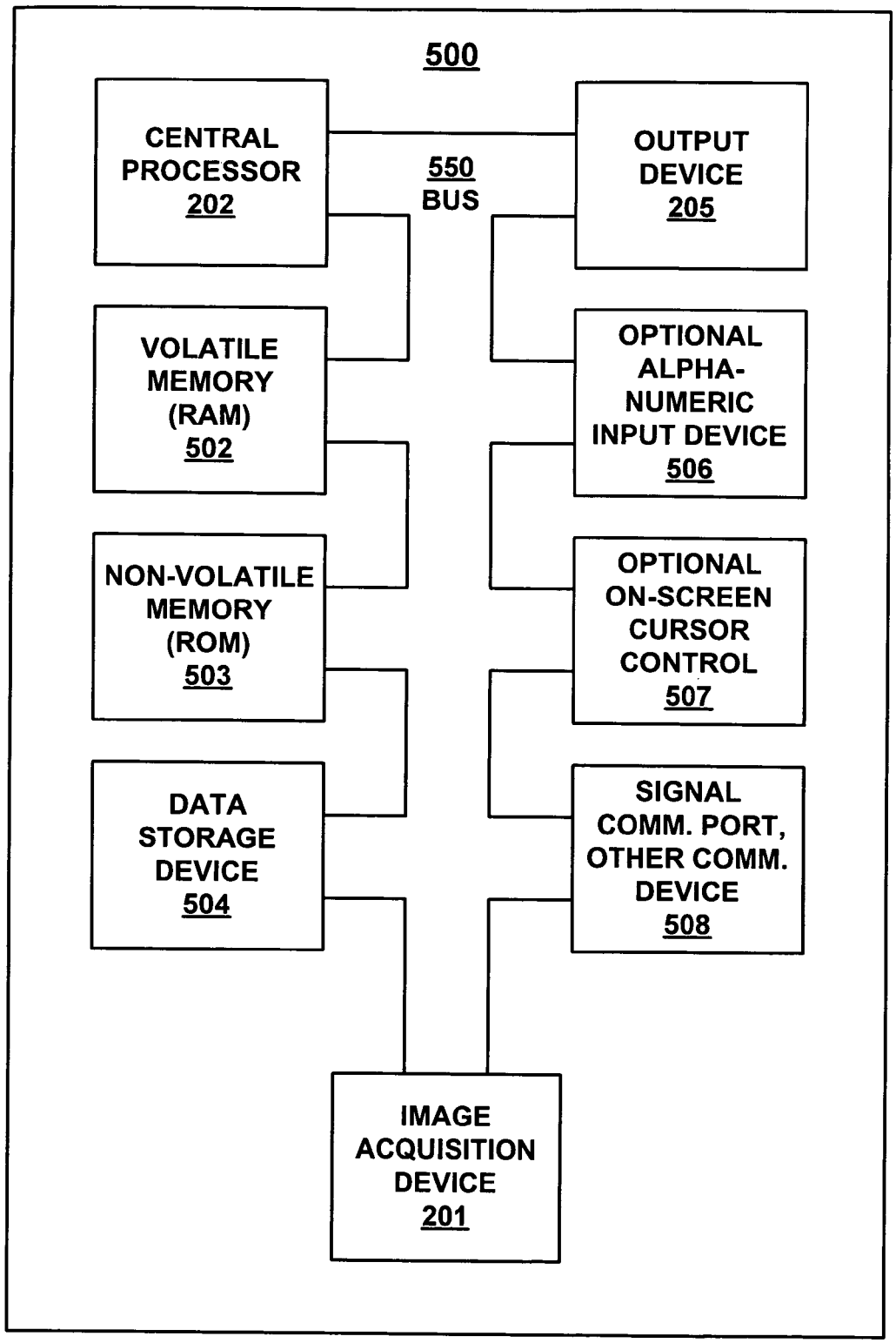
FIG. 5 is a block diagram overview of generic computer system upon which embodiments of the present invention may be practiced.

The software components of embodiments of the present invention run on computing devices. A configuration typical to a generic computing device is illustrated, in block diagram form, in FIG. 5. Generic computer 500 is characterized by a processor 202, connected electronically by a bus 550 to a volatile memory 502, a non-volatile memory 502, possibly some form of data storage device 504 and an output device 205, which can be implemented as a graphic display device, among other implementations.

It is noted here that feedback from the model of an object can be imparted to a user in many ways. While embodiments of the present invention discussed herein present feedback information in the form of a graphic display, other embodiments may use aural or tactile feedback. One embodiment can also use direct electronic commands to an automated image acquisition system. It is also noted that, when output device 205 is implemented as a graphic display, it can be implemented in different forms. While a video CRT or LCD screen is a common implementation, embodiments of the present invention can be implemented with other devices or none.

An alpha-numeric input device 506, cursor control 507, and communication I/O device 508 can be similarly connected via bus 550. Alpha-numeric input device 506 may be implemented as any number of possible devices, including a keyboard or a touch-screen video CRT or LCD device. However, embodiments of the present invention can be implemented in which an image-acquiring user may have no alpha-numeric input capability though a user of the model formed from the acquired images can provide alpha-numeric input by any implemented means.

Similarly, the employment of cursor control 507 is predicated on the implementation of a graphic display as output device 205. In those implementations in which an image acquisition device 201 and the processor 202 forming the model are not co-located, an embodiment of the present invention can implement a cursor control device 507 in reconstructor 203 while at the same time a cursor control device may not be implemented in the image acquisition device 201.

Communication I/O device 508 can be implemented as a wide range of possible devices, including a serial connection, USB, an infrared transceiver, a network adapter or an RF transceiver. Embodiments of the present invention can be implemented in a wireless network, in which the images acquired by the image acquisition device 201 are transmitted, wirelessly or otherwise, to a remotely located processor. Also, feedback information can be transmitted in a network, wireless or otherwise, to the user of the image acquisition device 201.

Image acquisition device 201 can be implemented as a digital still or video camera, either co-located with other elements of the model producing system, or as a stand-alone unit. Images can also, in one embodiment, be acquired from stored images and, in such case, image acquisition device 201 can be a computer enabled to seek and gather sufficient images to produce a model of a desired quality. An example of this process is the production of a model from images taken from archive film coverage of an object that no longer exists. In this example, the feedback information can be in the form of instructions to digitize additional frames of the archived film.

Another implementation of image acquisition device 201 can be in the form of a camera attachment for a handheld computing device. In an embodiment incorporating this implementation, image acquisition, model, and feedback generation and presentation are all contained within a single physical unit.

This description of embodiments of the present invention presents a process method for producing a model of an object through the feedback-enhanced acquisition of images. This description of embodiments of the present invention has illustrated novel aspects, such as scanning an object with a handheld device that has both input and output mechanisms and guiding a user during a scan with visual or aural feedback information.

It is specifically noted here that the feedback information can be generated, in one embodiment, in real time, meaning that the feedback information is available to enhance image acquisition during the acquisition process. By generating the feedback information in real time, the acquisition of images can be directed to efficiently acquire images sufficient to produce a model that meets some desired quality. The employment of real-time feedback information enables an unsophisticated user to efficiently and rapidly acquire the images necessary to produce a model of a desired quality with a minimum of equipment and training.

Embodiments of the present invention address the problem of digitizing physical objects so that little skill is necessary to produce a high quality model. This invention is usable in a variety of computer applications. such as video conferencing, complex remote product integration, online gaming, and online shopping.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for producing a model of an object, comprising:
   receiving at least one image of said object in a computing device;
   processing one or more of said at least one image to produce a model of said object:
   generating feedback information corresponding to said model of said object; wherein said feedback information comprises an indication of additional images that are needed to produce said model of said object,
   imparting said feedback information to a user of said computing device concurrently with said processing such that a determination is enabled to be made whether said model of said object is of a desired quality while said computing device is disposed to receive a further image of said object, and
   receiving a further image of said object in the computing device to produce said model of said object.

2. The method of claim 1, wherein receiving at least one image, processing one or more of said at least one image, generating feedback information, and imparting said feedback information is performed by a self-contained, handheld, computing device.

3. The method described in claim 1 wherein said feedback information directs the acquisition of said additional image necessary to produce said model of said object wherein said model is of said desired quality.

4. The method described in claim 1 wherein said imparting said feedback information is accomplished aurally.

5. The method described in claim 1 wherein said imparting said feedback information is accomplished tactilely.

6. The method described in claim 1 wherein said imparting said feedback information is accomplished visually.

7. The method described in claim 6 wherein said feedback information is a graphic representation of said model of said object, wherein said graphic representation enables a user to determine whether acquisition of an additional image of said object is necessary to produce said model of said object wherein said model is of said desired quality.

8. The method described in claim 1 wherein said feedback information is an image of a planar model.

9. The method described in claim 1 wherein said feedback information is an image of a three-dimensional model.

10. The method described in claim 1 wherein said receiving at least one image is accomplished in a handheld device.

11. The method described in claim 10 wherein said handheld device comprises a portable computing device.

12. The method described in claim 11 wherein said processing is accomplished in said handheld device.

13. The method described in claim 1 wherein said processing is accomplished in a remotely located computer.

14. The method described in claim 1 wherein said processing is accomplished in real time.

15. The method described in claim 1 wherein said determination whether said model is of a desired quality is made by a user.

16. The method described in claim 1 wherein said determination whether said model is of a desired quality is made by a device-driven process.

17. The method described in claim 1 wherein said desired quality is quantifiably selectable by a user.

18. A feedback generator for producing feedback information from a model of an object, comprising:
   a receiver for receiving information from said model of said object;
   a feedback information generator coupled to said receiver for generating feedback information from an evaluation of said model of said object, wherein said feedback information comprises an indication of additional images that are needed to produce said model of said object; and
   an output port, communicatively coupled to said feedback information generator, for imparting said feedback information to a user concurrently with the production of said model such that a determination is enabled to be made whether said model of said object is of a desired quality while said computing device is disposed to receive a further image of said object.

19. The feedback generator described in claim 18 wherein said feedback information generator comprises a comparator.

20. The feedback generator described in claim 18 wherein said feedback generator resides in a computing device.

21. The feedback generator described in claim 18 wherein said feedback information is a comparison of a characteristic of said model to a selected measurement standard.

22. The feedback generator described in claim 18 wherein said feedback information is an evaluated achievement of a selected state in the production of said model.

23. The feedback generator described in claim 18 wherein said feedback information is a graphic representation of said model.

24. The feedback generator described in claim 23 wherein said feedback information comprises a highlighted portion of said representation of said model.

25. The feedback generator described in claim 18 wherein said feedback information comprises aural information.

26. The feedback generator described in claim 18 wherein said feedback information comprises tactile information.

27. The feedback generator described in claim 18 wherein said feedback information comprises device-driven directions for acquiring a further image.

28. The feedback generator described in claim 18 wherein said desired quality is quantifiably selectable by a user.

29. The feedback generator described in claim 28 wherein said desired quality is a level of resolution.

30. The feedback generator described in claim 18 wherein said desired quality is an inclusion of a desired detail of said object in said model.

31. The feedback generator described in claim 18 wherein said feedback information is generated in real time.

32. The feedback generator described in claim 18 wherein said determination whether said model is of a desired quality is made by a user.

33. The feedback generator described in claim 18 wherein said determination whether said model is of a desired quality is made by a device-driven process.

34. A computer system having a processor coupled to a memory wherein said memory comprises instructions that, when executed, implement a method for producing a model of an object, said method comprising:

receiving at least one image of said object in a computing device;

processing one or more of said images to produce a model of said object;

generating feedback information corresponding to said model of said object; wherein said feedback information comprises an indication of additional images that are needed to produce said model of said object, imparting said feedback information to a user of said computing device concurrently with said processing such that a determination is enabled to be made whether said model of said object is of a desired quality while said computing device is disposed to receive a further image of said object, and receiving a further image of said object in the computing device to produce said model of said object.

35. A computer readable medium having instructions imprinted thereon that, when executed, implement a method for producing a model of an object, said method comprising:

receiving at least one image of said object in a computing device;

processing one or more of said images to produce a model of said object;

generating feedback information corresponding to said model of said object, wherein said feedback information comprises an indication of additional images that are needed to produce said model of said object, imparting said feedback information to a user of said computing device concurrently with said processing such that a determination is enabled to be made whether said model of said object is of a desired quality, and receiving a further image of said object in the computing device to produce said model of said object.

* * * * *

UNITED STATES PATENT AND TRADEMARK OFFICE
CERTIFICATE OF CORRECTION

PATENT NO. : 7,061,485 B2
APPLICATION NO. : 10/684067
DATED : June 13, 2006
INVENTOR(S) : Donald O. Tanguay, Jr. et al.

It is certified that error appears in the above-identified patent and that said Letters Patent is hereby corrected as shown below:

On the Title page, in field (73), in "Assignee" in column 1, line 2, delete "LP.," and insert -- L.P., --, therefor, In column 13, line 37, in Claim 1, after "object" delete ":" and insert -- ; --, therefor.

Signed and Sealed this

Twenty-second Day of December, 2009

David J. Kappos
*Director of the United States Patent and Trademark Office*